United States Patent
Ishizaki et al.

(10) Patent No.: US 11,641,143 B2
(45) Date of Patent: May 2, 2023

(54) CONTROL DEVICE-INTEGRATED ROTARY ELECTRIC MACHINE

(71) Applicant: Mitsubishi Electric Corporation, Tokyo (JP)

(72) Inventors: Mitsunori Ishizaki, Tokyo (JP); Toshihiro Matsunaga, Tokyo (JP); Takashi Yamamoto, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 327 days.

(21) Appl. No.: 16/759,443

(22) PCT Filed: Feb. 7, 2018

(86) PCT No.: PCT/JP2018/004157
§ 371 (c)(1),
(2) Date: Apr. 27, 2020

(87) PCT Pub. No.: WO2019/155541
PCT Pub. Date: Aug. 15, 2019

(65) Prior Publication Data
US 2020/0287428 A1    Sep. 10, 2020

(51) Int. Cl.
*H02K 5/04* (2006.01)
*H02K 11/33* (2016.01)
(Continued)

(52) U.S. Cl.
CPC .............. *H02K 5/04* (2013.01); *H02K 1/185* (2013.01); *H02K 5/24* (2013.01); *H02K 9/227* (2021.01); *H02K 11/33* (2016.01)

(58) Field of Classification Search
CPC .......... H02K 1/185; H02K 5/225; H02K 5/24; H02K 5/22; H02K 9/22; H02K 1/12;
(Continued)

(56) References Cited

U.S. PATENT DOCUMENTS

| | | | | |
|---|---|---|---|---|
| 2011/0080064 A1* | 4/2011 | Kudose | ..................... | H02K 5/04 310/89 |
| 2013/0259720 A1* | 10/2013 | Mills | ...................... | H02K 11/33 417/410.1 |

(Continued)

FOREIGN PATENT DOCUMENTS

| | | |
|---|---|---|
| JP | 2009-060760 A | 3/2009 |
| JP | 2011217434 A * | 10/2011 |

(Continued)

OTHER PUBLICATIONS

Fukuda etal (Fukuda), Motor, Oct. 27, 2011, JP 2011217434 (English Machine Translation) (Year: 2011).*

(Continued)

*Primary Examiner* — Alexander A Singh
(74) *Attorney, Agent, or Firm* — Sughrue Mion, PLLC; Richard C. Turner

(57) ABSTRACT

A control device-integrated rotary electric machine that has a light weight and a small radial-direction dimension. A cylindrical member is provided between a stator formed by stacking electromagnetic steel sheets and a frame retaining the stator, such that the cylindrical member is in a press-fitted state against the stator and the frame. The cylindrical member has a flange portion at one end thereof, and the flange portion is fixed by being held between the frame and a heat sink which is a member composing a control device.

6 Claims, 5 Drawing Sheets

(51) Int. Cl.
*H02K 1/18* (2006.01)
*H02K 9/22* (2006.01)
*H02K 5/24* (2006.01)

(58) Field of Classification Search
CPC ............ H02K 5/04; H02K 5/161; H02K 5/10;
H02K 5/08; H02K 9/19; H02K 5/203;
H02K 11/33; H02K 11/30; H02K 9/227;
H02K 9/00; H02K 5/18; H02K 9/18;
H02K 5/00; H02K 5/02; H02K 5/06;
H02K 5/15
USPC ...................................... 310/89, 64
See application file for complete search history.

(56) References Cited

U.S. PATENT DOCUMENTS

| | | | |
|---|---|---|---|
| 2014/0197705 A1* | 7/2014 | Sato ........................ | H02K 1/185 310/91 |
| 2014/0239754 A1 | 8/2014 | Yoshinori et al. | |
| 2014/0339966 A1* | 11/2014 | Tomizawa ............. | H02K 11/33 310/68 D |
| 2015/0171709 A1 | 6/2015 | Ito et al. | |
| 2015/0216083 A1 | 7/2015 | Kanazawa et al. | |
| 2016/0006324 A1 | 1/2016 | Akutsu et al. | |
| 2017/0174195 A1 | 6/2017 | Sagayama | |
| 2018/0127020 A1 | 5/2018 | Asao et al. | |

FOREIGN PATENT DOCUMENTS

| | | | | |
|---|---|---|---|---|
| JP | 2012-075319 A | 4/2012 | | |
| JP | 2014-165986 A | 9/2014 | | |
| JP | 2016-201904 A | 12/2016 | | |
| WO | WO-2013118703 A1 * | 8/2013 | ............ | H02K 11/33 |
| WO | 2014/033833 A1 | 3/2014 | | |
| WO | 2014/054155 A1 | 4/2014 | | |
| WO | 2014/188803 A1 | 11/2014 | | |
| WO | 2016/006435 A1 | 1/2016 | | |

OTHER PUBLICATIONS

Ipposhi et al (Ipposhi), Mechanically and Electronically Integrated Module, Aug. 15, 2013, WO 2013118703 (English Machine Translation) (Year: 2013).*
Extended European Search Report dated Dec. 18, 2020 in European Application No. 18905638.5.
Office Action dated Jan. 24, 2022 from the china National Intellectual Property Administration in CN Machine Application No. 201880087706.2.
International Search Report for PCT/JP2018/004157 dated Apr. 17, 2018 [PCT/ISA/210].
Office Action dated Aug. 3, 2022, issued in Chinese Application No. 201880087706.2.
Office Action dated Jan. 9, 2023 from the China National Intellectual Property Administration in CN Application No. 201880087706.2.

* cited by examiner

CONTROL DEVICE-INTEGRATED ROTARY ELECTRIC MACHINE

TECHNICAL FIELD

The present disclosure relates to a control device-integrated rotary electric machine formed by integrating a rotary electric machine and a control device for controlling the rotary electric machine.

BACKGROUND ART

Conventionally, there has been known a control device-integrated rotary electric machine which is formed by integrating a rotary electric machine and a control device for controlling the rotary electric machine, and is mounted to a vehicle. For example, Patent Document 1 discloses that a stator of a rotary electric machine is retained at the inner circumferential surface of a frame of the rotary electric machine and a rotor is provided on the inner side of the stator.

CITATION LIST

Patent Document

Patent Document 1: International Publication No. 2014/188803

SUMMARY OF THE INVENTION

Problems to be Solved by the Invention

Such a control device-integrated rotary electric machine mounted to a vehicle is required to be reduced in weight for the purpose of improving fuel efficiency. In addition, since the control device-integrated rotary electric machine is often provided and used in an engine room, durability against temperature change, vibration, and the like is required. Further, since the engine room has a limited space for providing the control device-integrated rotary electric machine, the rotary electric machine is also required to be reduced in the radial-direction dimension. While a stator of the rotary electric machine is fixed to the inner circumferential surface of a frame, it is necessary to make the outer diameter of the stator greater than the inner diameter of the frame and tighten the stator by the frame in order to obtain a predetermined retention force. If the frame is formed by an aluminum-based material or the like, weight reduction can be achieved at low cost. However, since the stator is formed by stacking electromagnetic steel sheets or the like, the contact surface with the frame has steps due to stacking. Therefore, if the stator is directly press-fitted into the frame at the time of fixation thereof, the aluminum-based material having low hardness is scraped, thus causing a problem of damaging the frame. Although it is possible to use shrink fit without directly press-fitting the stator, this causes a problem that the manufacturing cost increases due to equipment cost and the like. In addition, in order to enhance the retention force with the aluminum-based material having low strength, it is necessary to increase the thickness of the frame, thus causing a problem that the radial-direction dimension increases.

The present disclosure has been made to solve the above problems, and an object of the present disclosure is to provide a control device-integrated rotary electric machine that allows a stator to be press-fitted into a frame without damaging the frame.

Solution to the Problems

A control device-integrated rotary electric machine according to the present disclosure is a control device-integrated rotary electric machine including: a rotor fixed to a rotor shaft; a stator formed by stacking electromagnetic stacked steel sheets, and provided so as to be separated from the rotor and surround the rotor; a stator winding wound on the stator; a cylindrical member provided in contact with the stator; a frame provided in contact with the cylindrical member and retaining the stator; and a control device having a heat sink in contact with an inner side of the frame, and configured to supply power to the stator winding, wherein the cylindrical member has a flange portion at an end thereof, and the flange portion is held between the frame and the heat sink.

Effect of the Invention

The above configuration makes it possible to provide a control device-integrated rotary electric machine that allows a stator to be press-fitted into a frame without damaging the frame.

DESCRIPTION OF EMBODIMENTS

Figure 1:
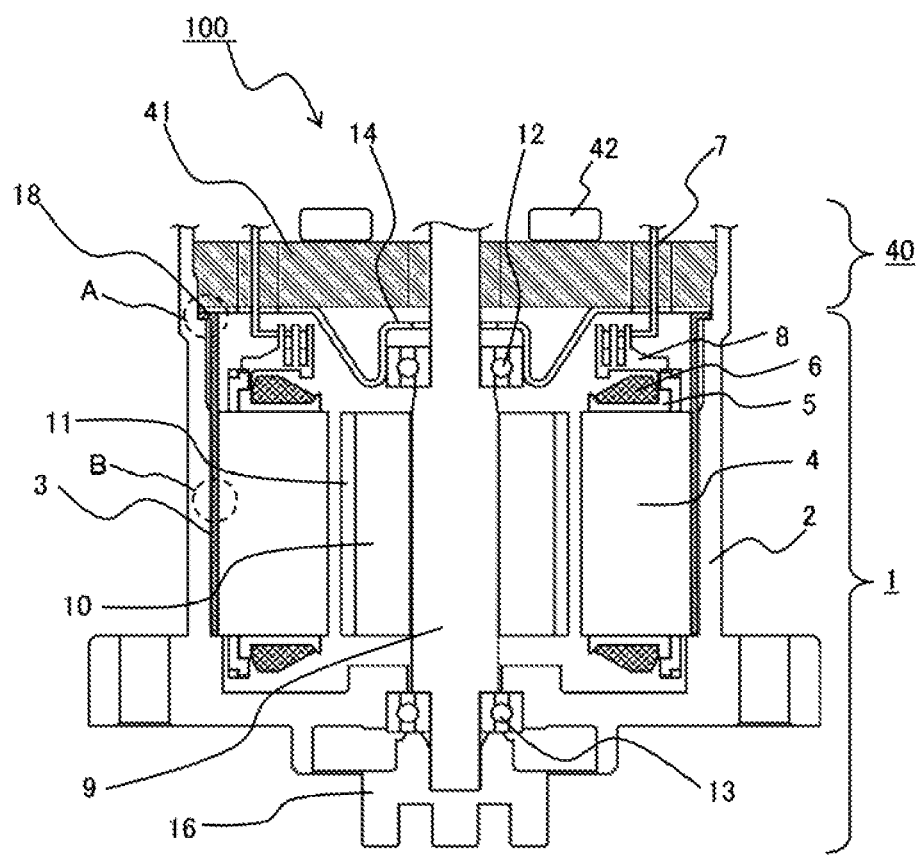
FIG. 1 is a sectional view showing the structure of a control device-integrated rotary electric machine according to embodiment 1.

Hereinafter, preferred embodiments of a control device-integrated rotary electric machine according to the present disclosure will be described with reference to drawings. In the drawings, the same reference characters denote the same or corresponding parts. In addition, for the purpose of facilitating the understanding, the scales of parts in the drawings may be different from the actual scales, and parts irrelevant to the features of the present disclosure are not shown.

Embodiment 1

Hereinafter, a control device-integrated rotary electric machine according to the present embodiment 1 will be described with reference to FIG. 1 and FIG. 2. In the present embodiment, an example in which the control device-integrated rotary electric machine is applied to an electric power steering mounted to a vehicle is shown, and the control device-integrated rotary electric machine is composed of a rotary electric machine body for assisting a steering force for steering the vehicle and a control device for controlling the rotary electric machine.

FIG. 1 is a sectional view of a control device-integrated rotary electric machine 100 according to embodiment 1.

In the drawing, the control device-integrated rotary electric machine 100 includes a rotary electric machine 1 body and a control device 40 inside a frame 2. A cylindrical member 3 is provided in contact with an inner circumferential portion of the frame 2, and a stator 4 is provided in contact with the inner circumferential surface of the cylindrical member 3. The frame 2 is made from an aluminum alloy which is inexpensive and has a light weight. The cylindrical member 3 is made from carbon steel. The stator 4 is formed by stacking electromagnetic steel sheets. The cylindrical member 3 and the stator 4 are fixed by being press-fitted into the frame 2.

While the entire structure of the cylindrical member 3 is described later, a flange portion 18 is formed at a rear end of the cylindrical member 3. As shown in circle A in the drawing, the flange portion 18 is placed on a stepped portion of the frame 2, and is held between the frame 2, and a bearing holder 14 and a heat sink 41 which is a member composing the control device 40, so as to be fixed in the axial direction. The heat sink 41 is also press-fitted into the frame 2 and is located in contact with the inner side of the frame 2.

A stator winding 6 is wound on the stator 4 with an insulator 5, which is an insulating material, interposed therebetween. A terminal 7 is provided for supplying current from the control device 40 to the stator winding 6, and a holder 8 is provided for fixing the terminal 7.

A rotor 10 is fixed to a rotor shaft 9, and a magnet 11 is provided to the rotor 10. The rotor shaft 9 is rotatably supported by a bearing 12 and a bearing 13. A rotation angle detection sensor (not shown) for detecting the rotation status of the rotor 10 is provided at the rear side of the rotor shaft 9. A boss 16 and the like for attachment to the vehicle are provided at the front end of the rotary electric machine 1. The stator 4 is provided so as to be separated from the rotor 10 and surround the rotor 10.

The control device 40, whose configuration is schematically shown in the drawing, includes a power conversion circuit 42 which performs power conversion between the stator winding 6 and external DC power and supplies power to the stator winding 6, and a control circuit (not shown) for controlling the power conversion circuit 42. The power conversion circuit 42 has power semiconductor elements and the like, and is provided in contact with the heat sink 41 for cooling.

Figure 2:
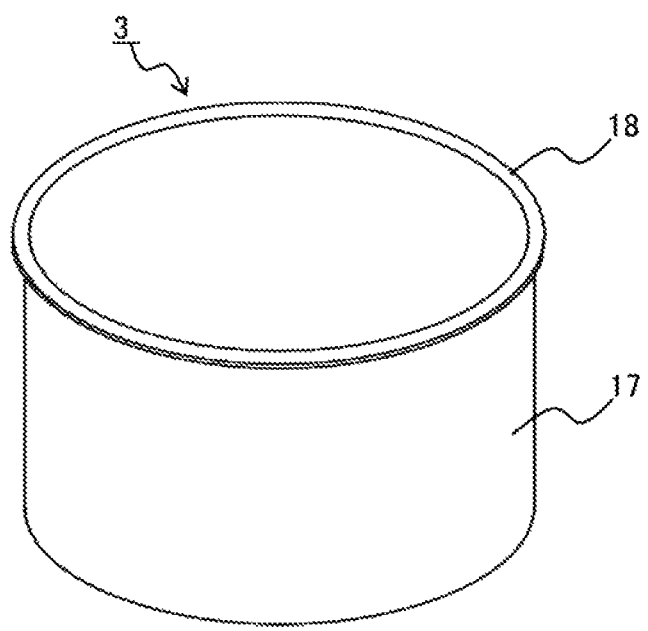
FIG. 2 is a perspective view showing a cylindrical member of the control device-integrated rotary electric machine according to embodiment 1.

FIG. 2 is a perspective view of the cylindrical member 3 shown in FIG. 1. The cylindrical member 3 includes a trunk portion 17 and the flange portion 18. The flange portion 18 is formed over the entire circumference at an end of the cylindrical member 3. The stator 4 and the trunk portion 17 of the cylindrical member 3 are press-fitted into the frame 2 such that the outer circumferential surface of the stator 4 and the inner circumferential surface of the trunk portion 17 of the cylindrical member 3 are in contact with each other, and the outer circumferential surface of the trunk portion 17 of the cylindrical member 3 and the inner circumferential surface of the frame 2 are in contact with each other.

The flange portion 18 of the cylindrical member 3 is held together with the bearing holder 14 between the frame 2 and the heat sink 41 press-fitted into the frame 2, so as to be fixed in the axial direction (see part in circle A in FIG. 1). In the present embodiment, first, a carbon steel plate is subjected to deep drawing to form a cup-shaped member having the flange portion 18, and the bottom portion on the side opposite to the flange portion 18 is removed, thus forming the cylindrical member 3.

As described above, in embodiment 1, steps due to stacking of the stator 4 come into contact with the inner circumferential surface of the cylindrical member 3 formed from carbon steel having high hardness, and the inner circumferential surface of the frame 2 comes into contact with the outer circumferential surface of the cylindrical member 3, which is a smooth surface. Therefore, even if the stator 4 and the cylindrical member 3 are directly press-fitted into the frame 2 made of an aluminum alloy, the frame 2 is prevented from being damaged. In addition, since shrink fit is not performed, the cost for shrink fit is not needed.

In addition, the flange portion 18 of the cylindrical member 3 is held between the frame 2 and the heat sink 41 so as to be fixed in the axial direction. Therefore, in addition to a force for retaining the stator 4 in the radial direction (see part in circle B in FIG. 1) by the frame 2, a retention force in the axial direction (see part in circle A in FIG. 1) is also applied, whereby the overall retention force is enhanced. Thus, the frame 2 can be thinned and the radial-direction dimension of the rotary electric machine can be reduced.

Embodiment 2

Hereinafter, a control device-integrated rotary electric machine according to the present embodiment 2 will be described with reference to FIG. 3 and FIG. 4. Also in the present embodiment 2, as in embodiment 1, an example in which the control device-integrated rotary electric machine is applied to an electric power steering mounted to a vehicle is shown, and the control device-integrated rotary electric machine includes a rotary electric machine body and a control device.

Figure 3:
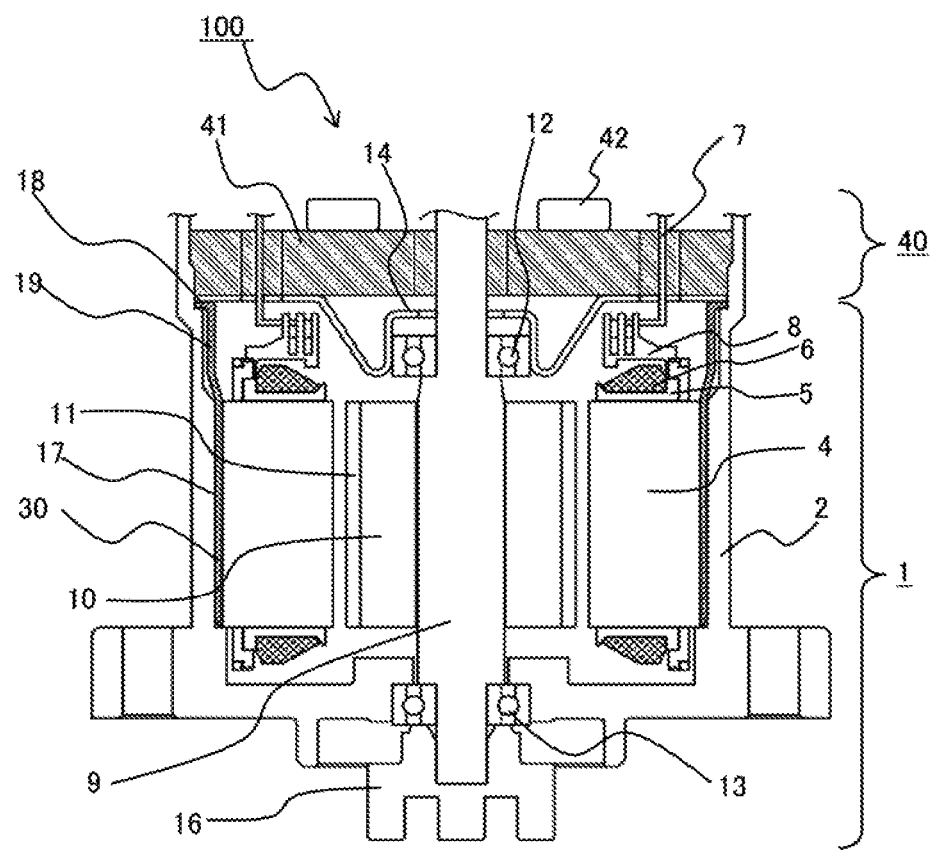
FIG. 3 is a sectional view showing the structure of a control device-integrated rotary electric machine according to embodiment 2.

FIG. 3 is a sectional view showing the structure of the control device-integrated rotary electric machine according to embodiment 2. A cylindrical member 30 has, on the flange portion 18 side, a stator introduction portion 19 having a greater inner diameter than that of the trunk portion 17. The stator introduction portion 19 of the cylindrical member 30 extends rearward of the part where the trunk portion 17 is in contact with the stator 4, and is formed between the trunk portion 17 and the flange portion 18. That is, since the stator introduction portion 19 is formed, the inner diameter at an end of the cylindrical member 30 where the flange portion 18 is formed is greater than the inner diameter of the trunk portion 17. The other configurations are the same as in embodiment 1.

Figure 4:
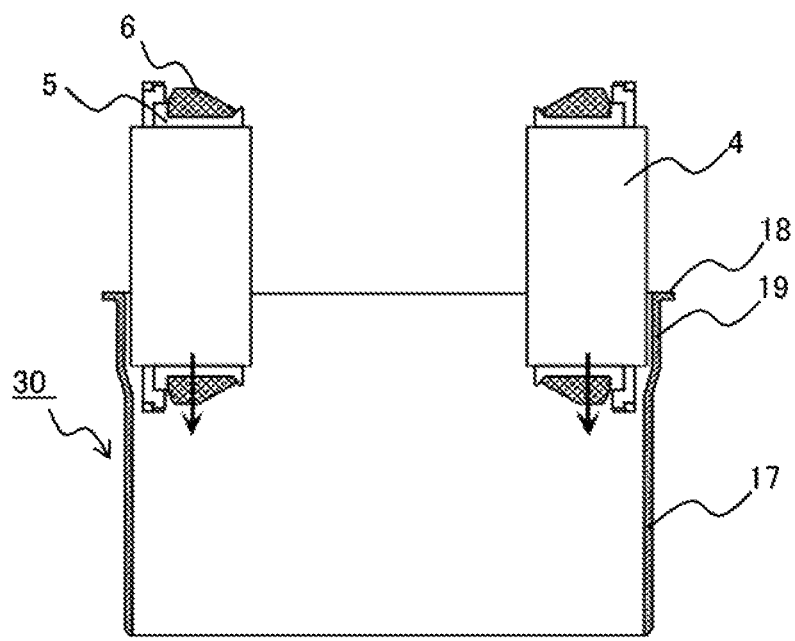
FIG. 4 is a sectional view showing a part of an assembly process for the control device-integrated rotary electric machine according to embodiment 2.

FIG. 4 is a sectional view showing a process for press-fitting the stator 4 into the cylindrical member 30 in the control device-integrated rotary electric machine shown in FIG. 3. The outer diameter of the stator 4 before assembly is greater than the inner diameter of the trunk portion 17 of the cylindrical member 3 so that the stator 4 and the cylindrical member 30 come into a state of being press-fitted to each other after assembly. Therefore, at the time of press-fitting the stator 4 from the flange portion side of the cylindrical member 30, the bottom surface and the corner portion of an outer circumferential end of the stator 4 come into contact with the flange portion 18 of the cylindrical member 30, and thus the flange portion 18 might be damaged, e.g., deformed. Accordingly, the stator introduction portion 19 having an inner diameter greater than the outer diameter of the stator 4 is formed rearward of the trunk portion 17 of the cylindrical member 30 which comes into contact with the stator 4, whereby the flange portion 18 is prevented from being damaged when the stator 4 is press-fitted into the cylindrical member 30.

Preventing damage of the flange portion leads to a firmed fixation part where the flange portion 18 of the cylindrical member 3 is held between the frame 2 and the heat sink 41.

In FIG. 4, as shown in the arrow direction, the stator 4 is press-fitted into the retained cylindrical member 30. However, the cylindrical member 30 may be press-fitted to the stator 4 while the stator 4 is retained. The stator 4 may be press-fitted into the cylindrical member 3 after the cylindrical member 3 is press-fitted into the frame 2. In either case, formation of the stator introduction portion 19 on the cylindrical member 30 enables prevention of damage on the flange portion 18 in the press-fit process.

As described above, embodiment 2 provides the same effects as in embodiment 1. Further, in a press-fit process in manufacturing of the control device-integrated rotary electric machine, the flange portion of the cylindrical member 30 is prevented from being damaged, thus providing an effect of firming a fixation part where the flange portion 18 of the cylindrical member 3 is held between the frame 2 and the heat sink 41.

Embodiment 3

The cylindrical member of the control device-integrated rotary electric machine according to each of embodiments 1 and 2 has a cylindrical shape with no discontinuity. In the present embodiment 3, an example in which a cylindrical member has a cutout in the axial direction will be described.

Figure 5:
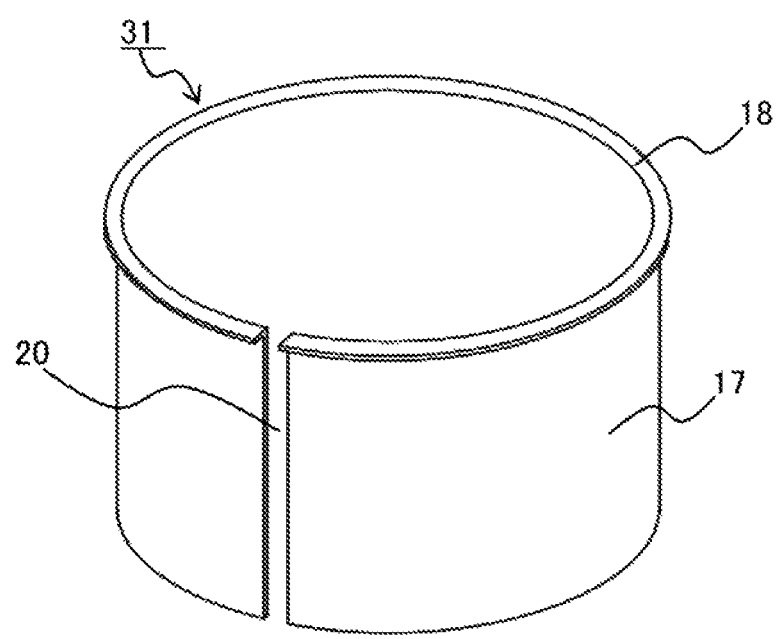
FIG. 5 is a perspective view showing another cylindrical member of a control device-integrated rotary electric machine according to embodiment 3.

FIG. 5 is a perspective view showing the structure of a cylindrical member 31 according to the present embodiment 3. The cylindrical member 31 is used for the control device-integrated rotary electric machine exemplified in each of embodiments 1 and 2, for example.

The cylindrical member 31 has a cutout 20 penetrating in the axial direction. That is, the cutout 20 is formed in the axial direction so as to reach both ends of the cylindrical member 31. In manufacturing the control device-integrated rotary electric machine, the cylindrical member 31 is press-fitted into the frame 2. At this time, the press-fitting is performed while a load is applied in a direction to reduce the diameter of the cylindrical member 31, so that the press-fit force can be reduced, thus obtaining an effect of facilitating assembly.

In FIG. 5, the case where the cutout 20 is formed in the cylindrical member 3 shown in FIG. 2 in embodiment 1 has been shown as an example. However, the cutout may be formed in the axial direction in the cylindrical member 30 having the stator introduction portion 19 shown in FIG. 4 in embodiment 2.

As described above, the present embodiment 3 provides the same effects as in embodiments 1 and 2, and also provides an effect of facilitating assembly.

Embodiment 4

The cylindrical member of the control device-integrated rotary electric machine according to each of embodiments 1 to 3 has the flange portion formed over the circumference at an end of the cylindrical member. In the present embodiment 4, an example in which a cylindrical member has a flange portion at parts of the circumference at the end will be described.

Figure 6:
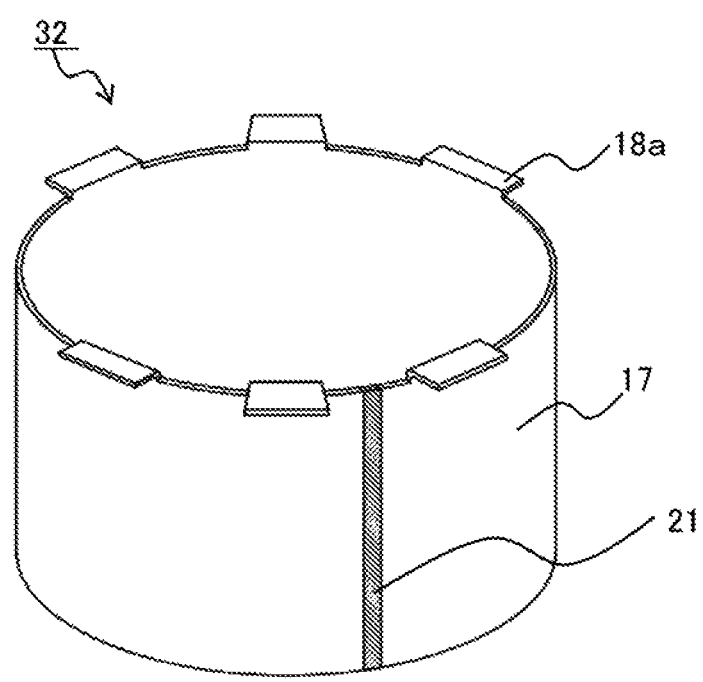
FIG. 6 is a perspective view showing a cylindrical member of a control device-integrated rotary electric machine according to embodiment 4.

FIG. 6 is a perspective view showing the structure of a cylindrical member 32 according to the present embodiment 4, and the cylindrical member 32 is used for the control device-integrated rotary electric machine exemplified in each of embodiments 1 and 2, for example.

The cylindrical member 32 is formed by working a carbon steel plate, and a flange portion 18a provided at the rear end is formed in a divided manner at a plurality of locations.

Since the cylindrical member 32 is formed by working a carbon steel plate through a process described below, the cylindrical member 32 has a welded portion 21.

FIG. 7A to FIG. 7D show an example of a manufacturing process for the cylindrical member 32 shown in FIG. 6.

Figure 7A:
FIG. 7A shows a part of a manufacturing process for the cylindrical member of the control device-integrated rotary electric machine according to embodiment 4.
Figure 7B:
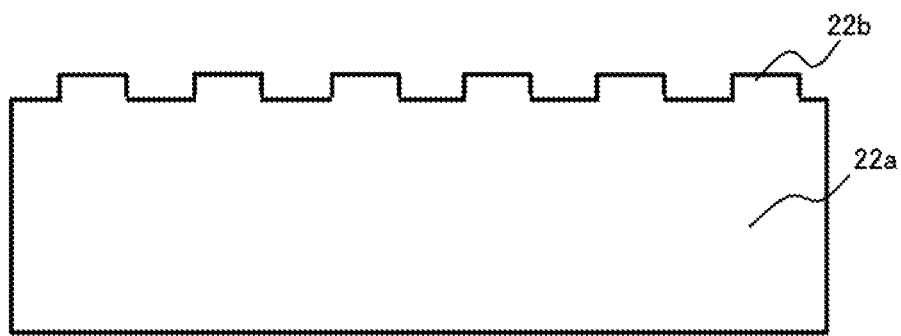
FIG. 7B shows a part of the manufacturing process for the cylindrical member of the control device-integrated rotary electric machine according to embodiment 4.
Figure 7C:
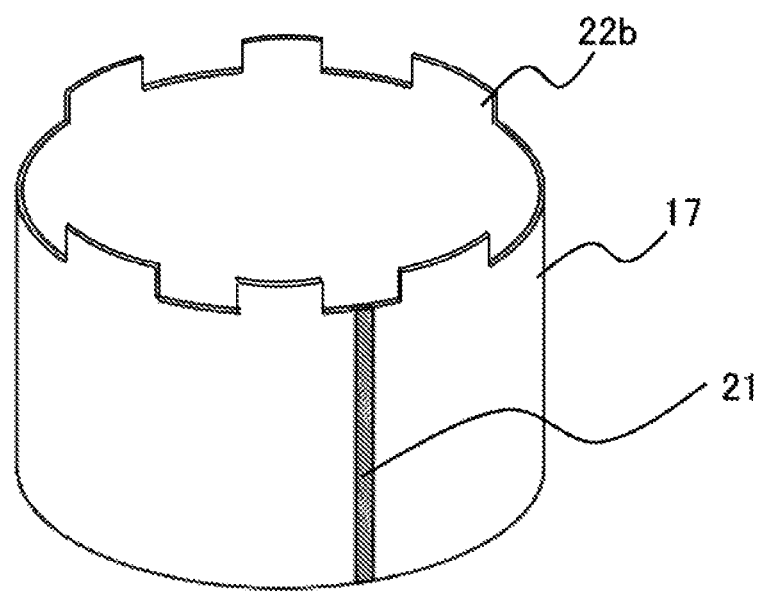
FIG. 7C shows a part of the manufacturing process for the cylindrical member of the control device-integrated rotary electric machine according to embodiment 4.
Figure 7D:
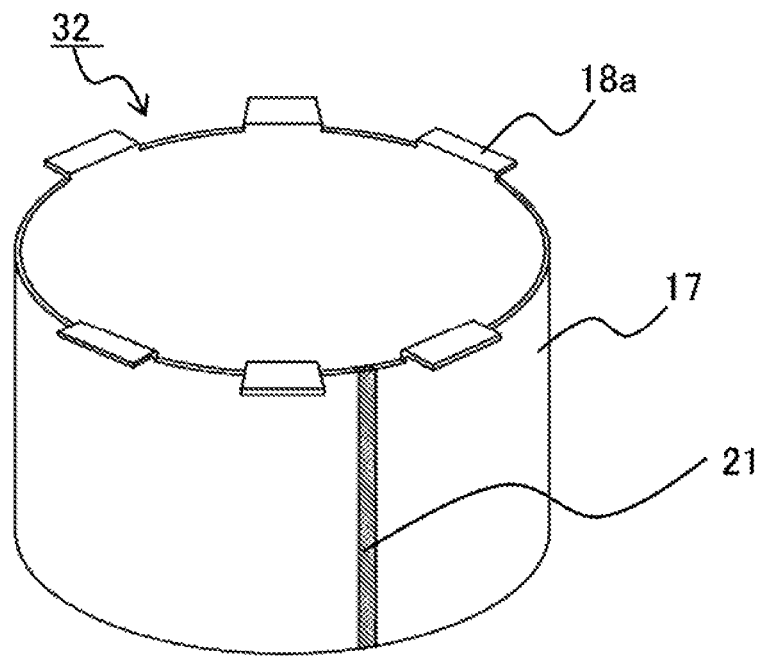
FIG. 7D shows a part of the manufacturing process for the cylindrical member of the control device-integrated rotary electric machine according to embodiment 4.

In FIG. 7A, a carbon steel plate 22 for forming the cylindrical member 32 is prepared. In FIG. 7B, a plurality of parts 22b to become the flange portions 18a are formed on one side of a part 22a forming the trunk portion 17, through stamping or cutting. As shown in FIG. 7C, the part 22a is worked into a cylindrical shape, and the two short sides of the part 22a are welded to each other. As shown in FIG. 7D, the parts 22b are bent to form the flange portions 18a.

In the above structure, the flange portions 18a are formed at parts of the circumference at an end of the cylindrical member 32, and therefore the same effects as in embodiment 1 are obtained. That is, even if the stator 4 and the cylindrical member 32 are directly press-fitted into the frame 2 made of an aluminum alloy, the frame 2 is prevented from being damaged. In addition, since shrink fit is not performed, the cost for shrink fit is not needed.

In addition, the flange portions 18a of the cylindrical member 32 are held between the frame 2 and the heat sink 41 so as to be fixed in the axial direction. Therefore, in addition to retention of the stator 4 in the radial direction by the frame 2, the stator 4 is also retained in the axial direction, whereby the overall retention force is enhanced. Thus, the frame 2 can be thinned and the radial-direction dimension of the rotary electric machine can be reduced.

Figure 8:
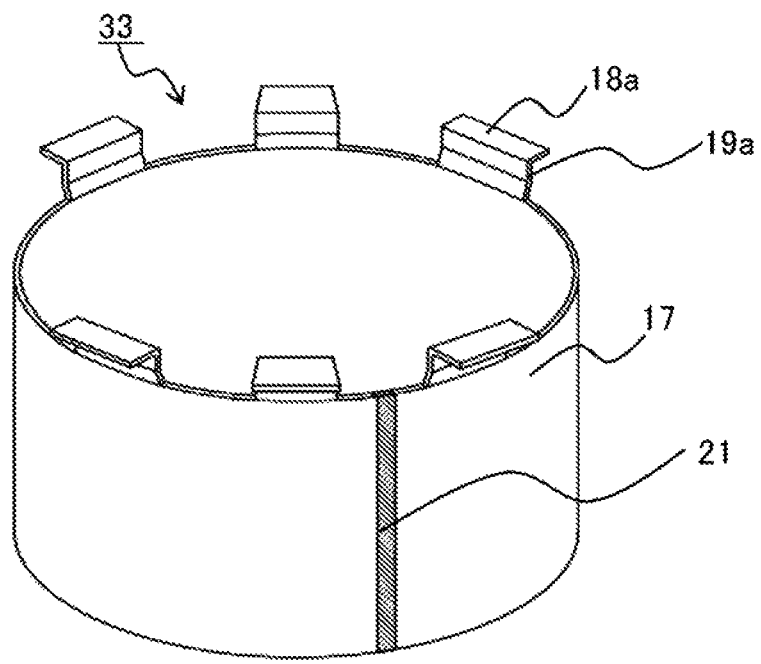
FIG. 8 is a perspective view showing another cylindrical member of the control device-integrated rotary electric machine according to embodiment 4.

FIG. 8 is a perspective view showing another example of a cylindrical member according to the present embodiment 4. In the drawing, a stator introduction portion 19a having a greater inner diameter than the inner diameter of the trunk portion 17 is formed in a divided manner at a plurality of locations at the rear end of a cylindrical member 33, and the flange portions 18a are formed at the ends of the respective stator introduction portions 19a.

This cylindrical member 33 can be manufactured through a similar manufacturing process as in FIG. 7A to FIG. 7D described above. In FIG. 7B, the shapes of the parts 22b are formed in consideration of the stator introduction portions 19a. In addition, in FIG. 7D, the shapes of the stator introduction portions 19a and the flange portions 18a are formed by bending the parts 22b in two stages.

The above structure provides the same effects as in embodiment 1 and embodiment 2. Further, the area of the steel plate forming the cylindrical member 3 is reduced, whereby weight reduction can be achieved.

The present embodiment has been described under the assumption that the stator 4 is press-fitted into the cylindrical member 32, 33. However, the cylindrical member 32, 33 may be press-fitted to the stator 4. The stator 4 may be press-fitted into the cylindrical member 32, 33 after the cylindrical member 32, 33 is press-fitted into the frame 2.

In the case of press-fitting the cylindrical member 32, 33 into the frame 2, in FIG. 7C, it is desirable that the two short sides of the part 22a are not welded to each other when the cylindrical member 32, 33 is formed from a carbon steel plate. Thus, the cylindrical member 32, 33 can be press-fitted with a load applied in a direction to reduce the diameter of the cylindrical member 32, 33, whereby an effect of facilitating assembly owing to reduction in a press-fit force can be obtained.

As described above, applying the cylindrical member shown in embodiment 4 to the control-integrated rotary electric machine exemplified in embodiment 1 or 2 provides the same effects as in embodiments 1 to 3. That is, in the manufacturing process for the control-integrated rotary electric machine, press-fitting is performed with the cylindrical member interposed between the frame and the stator, and therefore, in the press-fitting, the inner circumferential surface of the frame comes into contact with the outer circumferential surface of the trunk portion of the cylindrical member, which is a smooth surface. Thus, even if the frame 2 is made of an aluminum-based material having a light weight, the frame 2 is not damaged, and in addition, since press-fitting by shrink fit is not needed, the equipment cost can be reduced. Further, since the flange portion of the cylindrical member is fixed by being held between the frame and the heat sink, the retention force is enhanced. Therefore, the frame can be thinned and the radial-direction dimension of the rotary electric machine can be reduced.

Further, in embodiment 4, the weight of the cylindrical member can be reduced as compared to embodiments 1 to 3.

The above embodiments may be combined with each other, or each of the above embodiments may be modified or simplified as appropriate.

DESCRIPTION OF THE REFERENCE CHARACTERS 1 rotary electric machine
2 frame
3, 30, 31, 32, 33 cylindrical member
4 stator
5 insulator
6 stator winding
7 terminal
8 holder
9 rotor shaft
10 rotor
11 magnet
12 bearing
13 bearing
14 bearing holder
16 boss
17 trunk portion
18, 18a flange portion
19, 19a stator introduction portion
20 cutout
21 welded portion
22 steel plate
22a trunk portion forming part
22b flange portion forming part
40 control device
41 heat sink
42 power conversion device
100 control device-integrated rotary electric machine

The invention claimed is:

1. A control device-integrated rotary electric machine comprising:
a rotor fixed to a rotor shaft;
a stator formed by stacking electromagnetic steel sheets, and provided so as to be separated from the rotor and surround the rotor;
a stator winding wound on the stator;
a cylindrical member provided in contact with the stator;
a frame provided in contact with the cylindrical member and retaining the stator; and
a control device having a heat sink in contact with an inner side of the frame, and configured to supply power to the stator winding, wherein
the cylindrical member has a flange portion at an end thereof,
the flange portion is held between the frame and the heat sink so as to be fixed in an axial direction, and
the flange portion is formed over an entire circumference at the end of the cylindrical member.

2. The control device-integrated rotary electric machine according to claim 1, wherein
an inner diameter of the cylindrical member at the end where the flange portion is formed is greater than an inner diameter of a trunk portion of the cylindrical member.

3. The control device-integrated rotary electric machine according to claim 2, wherein
the cylindrical member has a cutout extending in the axial direction so as to reach both ends of the cylindrical member.

4. The control device-integrated rotary electric machine according to claim 1, wherein
the cylindrical member has a cutout extending in the axial direction so as to reach both ends of the cylindrical member.

5. The control device-integrated rotary electric machine according to claim 1, wherein
the frame has a step on the inner circumferential side, and the flange portion is held between the step of the frame and the heat sink so as to be fixed in the axial direction.

6. The control device-integrated rotary electric machine according to claim 1, wherein
the flange portion and the heat sink are held press-fitted into the frame.

* * * * *